US 8,301,322 B2

(12) United States Patent
Mitsutani

(10) Patent No.: US 8,301,322 B2
(45) Date of Patent: Oct. 30, 2012

(54) APPARATUS AND METHOD FOR ACTIVATING SYSTEM OF VEHICLE

(75) Inventor: Noritake Mitsutani, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 479 days.

(21) Appl. No.: 12/672,233

(22) PCT Filed: Sep. 2, 2008

(86) PCT No.: PCT/JP2008/065733
§ 371 (c)(1),
(2), (4) Date: Feb. 4, 2010

(87) PCT Pub. No.: WO2009/034878
PCT Pub. Date: Mar. 19, 2009

(65) Prior Publication Data
US 2010/0299008 A1    Nov. 25, 2010

(30) Foreign Application Priority Data

Sep. 10, 2007  (JP) ................................. 2007-234420

(51) Int. Cl.
*B60L 9/00* (2006.01)
(52) U.S. Cl. .......... 701/22; 320/104; 320/109; 320/128; 320/165; 180/65.21; 180/65.29
(58) Field of Classification Search .................... 701/22; 320/104, 109, 128, 165; 180/65.21, 65.29
See application file for complete search history.

(56) References Cited

U.S. PATENT DOCUMENTS

| 5,293,947 | A | 3/1994 | Stratton | |
| 2006/0028178 | A1* | 2/2006 | Hobbs | ........................... 320/128 |

FOREIGN PATENT DOCUMENTS

| JP | A-7-123519 | 5/1995 |
| JP | A-7-255105 | 10/1995 |
| JP | A-10-304582 | 11/1998 |
| JP | A-11-205909 | 7/1999 |
| RU | 2 100 221 C1 | 12/1997 |
| RU | 2 113 366 C1 | 6/1998 |

OTHER PUBLICATIONS

Office Action issued in corresponding Russian Patent Application No. 2010114270 dated Mar. 1, 2011 (with translation).
"Japan Electric Vehicle Association Standard, Electric Vehicle Conductive Charging System, General Requirements" Japan Electric Vehicle Association, Mar. 29, 2001 (with English Translation).
"SAE Electric Vehicle Conductive Charge Coupler" Surface Vehicle Recommended Practice, SAE International, Nov. 2001.
International Search Report issued in Application No. PCT/JP2008/065733 on Dec. 9, 2008.

* cited by examiner

*Primary Examiner* — Thomas Black
*Assistant Examiner* — Luke Huynh
(74) *Attorney, Agent, or Firm* — Oliff & Berridge, PLC

(57) ABSTRACT

Until a vehicle system is activated, a switching circuit outputs a pilot signal to an OR circuit. As a result, lowering of the potential of the pilot signal caused by a resistance circuit is avoided, and the pilot signal is provided in a non-pulsed manner. A power supply CPU is activated in accordance with any one of a connector signal and the non-pulsed pilot signal. When the vehicle system is activated, the switching circuit switches an output destination of the pilot signal to the resistance circuit.

12 Claims, 14 Drawing Sheets

APPARATUS AND METHOD FOR ACTIVATING SYSTEM OF VEHICLE

TECHNICAL FIELD

The present invention relates to an apparatus and a method for activating a system of a vehicle. In particular, the present invention relates to an apparatus and a method for activating a system of a vehicle configured to be capable of charging a vehicle-mounted power storage device for driving the vehicle from a power supply external to the vehicle.

BACKGROUND ART

In recent years, an electric vehicle, a hybrid vehicle, a fuel cell vehicle and the like have received attention as an environmentally-friendly vehicle. On these vehicles, a motor that generates driving force for traveling as well as a power storage device that stores electric power supplied to the motor are mounted. The hybrid vehicle further has an internal combustion engine mounted thereon as a power source, together with the motor. The fuel cell vehicle has a fuel cell mounted thereon as a direct current (DC) power supply for driving the vehicle.

Among these vehicles, a vehicle is known in which a vehicle-mounted power storage device for driving the vehicle can be charged from a power supply in ordinary households. For example, a power supply outlet provided at home is connected to a charging port provided at the vehicle by using a charging cable, so that electric power is supplied from the power supply in the ordinary households to the power storage device. It is noted that the vehicle in which the vehicle-mounted power storage device can be charged from the power supply provided outside the vehicle will also be referred to as "plug-in vehicle" hereinafter.

The standard for the plug-in vehicle is set in "Electric Vehicle Conductive Charging System, General Requirements" (Non-Patent Document 1) in Japan, and in "SAE Electric Vehicle Conductive Charge Coupler" (Non-Patent Document 2) in the United States of America.

In "Electric Vehicle Conductive Charging System, General Requirements" and "SAE Electric Vehicle Conductive Charge Coupler," the standard for a control pilot is defined as an example. The control pilot is defined as a control line that connects, via a control circuit on the vehicle side, a ground of the vehicle and a control circuit of EVSE (Electric Vehicle Supply Equipment) for supplying electric power from an on-premises wiring to the vehicle (Non-Patent Document 1). Based on a pilot signal communicated through this control line, a connection state of the charging cable, whether or not electric power is supplied from the power supply to the vehicle, a rated current of the EVSE and the like are determined.

The details of a technique of activating a vehicle system again at the time of recovery from a power failure that has occurred during charging are not specifically set in "Electric Vehicle Conductive Charging System, General Requirements" and "SAE Electric Vehicle Conductive Charge Coupler."

Japanese Patent Laying-Open No. 10-304582 (Patent Document 1) discloses a technique of activating a vehicle system again at the time of recovery from a power failure. In the vehicle system where a power supply is activated in accordance with the operation of a limit switch when a paddle of a charging cable is inserted into a charging port of a vehicle, there is a problem that, when a power failure occurs during charging, the vehicle system stops and the paddle remains inserted into the charging port, and thereby, charging is not resumed even when the infrastructure side recovers from the power failure. Therefore, in a charging apparatus disclosed in this publication, at the time of the recovery from the power failure, a system activation signal is generated upon receipt of a communication signal from the infrastructure side and a battery ECU (Electronic Control Unit) is activated to resume charging (see Patent Document 1).

Patent Document 1: Japanese Patent Laying-Open No. 10-304582

Patent Document 2: Japanese Patent Laying-Open No. 11-205909

Non-Patent Document 1: "Japan Electric Vehicle Association Standard, Electric Vehicle Conductive Charging System; General Requirements" Japan Electric Vehicle Association, Mar. 29, 2001

Non-Patent Document 2: "SAE Electric Vehicle Conductive Charge Coupler" SAEJ1772, SAE International, November, 2001

DISCLOSURE OF THE INVENTION

Problems to be Solved by the Invention

The charging apparatus described in Japanese Patent Laying-Open No. 10-304582, however, is based on the premise that the limit switch is in the ON state. Therefore, when an abnormality occurs such as a breakdown of the limit switch and a break in a signal line thereof, the vehicle system cannot be activated. As long as the vehicle system cannot be activated, detection of the above abnormality is also impossible.

On the other hand, it is desirable to utilize the pilot signal set in "Electric Vehicle Conductive Charging System, General Requirements" and "SAE Electric Vehicle Conductive Charge Coupler" as an activation signal for the vehicle system because the vehicle system can be activated even when the above abnormality occurs, and furthermore, it is not required to separately provide a signal line for activating the system from the infrastructure side.

The above pilot signal is, however, a pulse signal and an ECU (a power supply ECU and the like) for receiving the system activation signal generally has a slow control cycle in order to suppress electric power consumption during standby. Therefore, if the pilot signal is used as it is as the system activation signal, the ECU for receiving the system activation signal cannot recognize the pilot signal in some cases.

Thus, the present invention has been made to solve these problems, and an object thereof is to provide an apparatus for activating a system of a vehicle capable of reliably activating the vehicle system when a power storage device is charged from a power supply external to the vehicle.

In addition, another object of the present invention is to provide a method for activating a system of a vehicle capable of reliably activating the vehicle system when a power storage device is charged from a power supply external to the vehicle.

Means for Solving the Problems

According to the present invention, an apparatus for activating a system of a vehicle is an apparatus for activating a system of a vehicle configured to be capable of charging a vehicle-mounted power storage device for driving the vehicle from a power supply external to the vehicle, including: a signal generating circuit; an EVSE controller; an activation controller; and a signal manipulating circuit. The signal generating circuit is configured to be capable of generating a connection signal (connector signal CNCT) indicating connection between the vehicle and a charging cable through which electric power is supplied to the vehicle from the power supply external to the vehicle. The EVSE controller is provided outside the vehicle and is configured to be capable of generating a pilot signal (pilot signal CPLT) whose pulse width is modulated based on a magnitude of a rated current that can be supplied to the vehicle through the charging cable and sending the pilot signal to the vehicle. The activation controller is mounted on the vehicle for activating the system of the vehicle in accordance with a system activation operation by a user when travel of the vehicle is requested, and for activating the system in accordance with any one of the connection signal and the pilot signal when charging of the power storage device from the power supply external to the vehicle is requested. The signal manipulating circuit is mounted on the vehicle and is configured to be capable of notifying the EVSE controller to provide the pilot signal in a non-pulsed manner until the system is activated by the activation controller, by manipulating a potential of the pilot signal.

Preferably, a pulse cycle of the pilot signal is shorter than an operation cycle of the activation controller.

Preferably, by manipulating the potential of the pilot signal in accordance with the connection between the charging cable and the vehicle as well as a state of the vehicle, the signal manipulating circuit notifies the EVSE controller of the connection of the charging cable and the state of the vehicle, and in addition, notifies the EVSE controller to provide the pilot signal in the non-pulsed manner until the system is activated by the activation controller.

More preferably, the signal manipulating circuit includes a resistance circuit and a switching circuit. The resistance circuit is configured to be capable of changing the potential of the pilot signal in stages in accordance with the connection between the charging cable and the vehicle as well as the state of the vehicle. The switching circuit is placed between an input terminal of the pilot signal in the vehicle and the resistance circuit as well as the activation controller, for outputting, to the activation controller, the pilot signal input from the input terminal without passing through the resistance circuit until the system is activated by the activation controller, and switching, to the resistance circuit, an output destination of the pilot signal input from the input terminal, when the system is activated by the activation controller.

More preferably, the switching circuit switches, to the activation controller, the output destination of the pilot signal input from the input terminal, when charging of the power storage device from the power supply external to the vehicle stops.

Preferably, the apparatus for activating a system of a vehicle further includes an abnormality detecting unit. The abnormality detecting unit detects that the pilot signal is abnormal, if a state in which the pilot signal does not oscillate and the potential of the pilot signal is generated continues for a prescribed time period after the output destination of the pilot signal is switched to the resistance circuit by the switching circuit.

Preferably, a charger for converting electric power supplied from the power supply external to the vehicle to a voltage level of the power storage device and charging the power storage device is mounted on the vehicle.

In addition, according to the present invention, a method for activating a system of a vehicle is a method for activating a system of a vehicle configured to be capable of charging a vehicle-mounted power storage device for driving the vehicle from a power supply external to the vehicle, including the steps of: activating the system of the vehicle in accordance with a system activation operation by a user when travel of the vehicle is requested; activating the system in accordance with any one of a connection signal (connector signal CNCT) indicating connection between the vehicle and a charging cable through which electric power is supplied to the vehicle from the power supply external to the vehicle, and a pilot signal (pilot signal CPLT) which is generated by an EVSE controller provided outside the vehicle and whose pulse width is modulated based on a magnitude of a rated current that can be supplied to the vehicle through the charging cable, when charging of the power storage device from the power supply external to the vehicle is requested; and notifying the EVSE controller to provide the pilot signal in a non-pulsed manner until the system is activated, by manipulating a potential of the pilot signal in the vehicle.

Preferably, in the step of activating the system in accordance with any one of the connection signal and the pilot signal, the connection signal and the pilot signal are sampled at a prescribed cycle. A pulse cycle of the pilot signal is shorter than the prescribed cycle.

Preferably, the method for activating a system of a vehicle further includes the steps of notifying the EVSE controller of permission for oscillation of the pilot signal by manipulating the potential of the pilot signal, when the system is activated; and detecting that the pilot signal is abnormal, if a state in which the pilot signal does not oscillate and the potential of the pilot signal is generated continues for a prescribed time period after the system is activated.

Effects of the Invention

In the present invention, the system of the vehicle is activated in accordance with the system activation operation by the user when travel of the vehicle is requested, and the system is activated in accordance with any one of the connection signal (connector signal CNCT) and the pilot signal (pilot signal CPLT) when charging of the power storage device from the power supply external to the vehicle is requested. Therefore, the system is activated in accordance with the pilot signal even when the connection signal is abnormal or is not generated. Here, the pilot signal is a signal whose pulse width is modulated based on the magnitude of the rated current that can be supplied to the vehicle through the charging cable. Since the pilot signal is provided in the non-pulsed manner until the system is activated, the pilot signal can be recognized even if the pilot signal has a long sampling cycle.

Thus, according to the present invention, the vehicle system can be reliably activated when the power storage device is charged from the power supply external to the vehicle. In addition, since the system can be activated in accordance with any one of the connection signal and the pilot signal, the system can be activated in accordance with the pilot signal even when the connection signal is not generated after recovery from a power failure. Furthermore, the system can be activated even when the connection signal is abnormal, and the activation of the system enables the abnormality in the connection signal to be detected.

DESCRIPTION OF THE REFERENCE SIGNS

Figure 1:
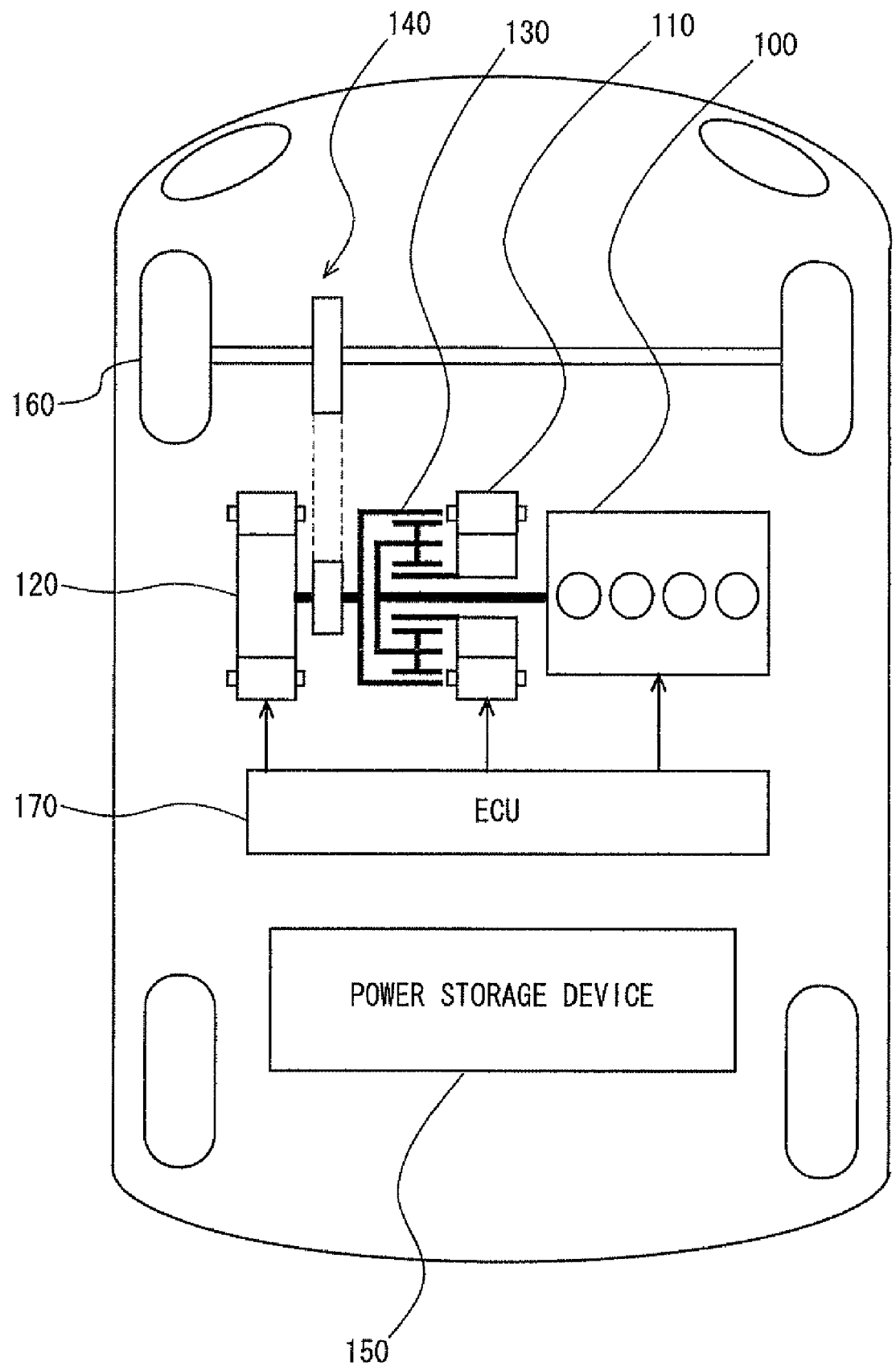
FIG. 1 is an overall block diagram of a plug-in hybrid vehicle shown as an example of a vehicle to which a system activation apparatus according to an embodiment of the present invention is applied.

100 engine; 110 first MG; 112, 122 neutral point; 120 second MG; 130 power split device; 140 reduction gear; 150 power storage device; 160 front wheel; 170 ECU; 171 voltage sensor; 172 current sensor; 200 converter; 210 first inverter; 210A, 220A upper arm; 210B, 220B lower arm; 220 second inverter; 250 SMR; 260 DFR; 270 charging port; 280 LC filter; 290 charger; 300 charging cable; 310 connector; 312 limit switch; 320 plug; 330 CCID; 332, 526 relay; 334 EVSE controller; 400 power supply outlet; 402 power supply; 506 auxiliary power supply node; 508, 522, 524, 604 resistance element; 510 switching circuit; 512, 514, 516 terminal; 518 OR circuit; 520 resistance circuit; 528 ground node; 530 power supply CPU; 532 control CPU; 602 oscillator; 606 electromagnetic coil; 608 leakage detector

BEST MODES FOR CARRYING OUT THE INVENTION

Embodiments of the present invention will be hereinafter described in detail with reference to the drawings. The same or corresponding portions are represented by the same reference characters in the drawings, and description thereof will not be repeated.

FIG. 1 is an overall block diagram of a plug-in hybrid vehicle shown as an example of a vehicle to which a system activation apparatus according to an embodiment of the present invention is applied. Referring to FIG. 1, this plug-in hybrid vehicle includes an engine 100, a first MG (Motor Generator) 110, a second MG 120, a power split device 130, a reduction gear 140, a power storage device 150, a drive wheel 160, and an ECU 170.

Engine 100, first MG 110 and second MG 120 are coupled to power split device 130. This plug-in hybrid vehicle travels by using driving force from at least one of engine 100 and second MG 120. Motive power generated by engine 100 is split by power split device 130 into two paths, that is, one path through which the motive power is transmitted to drive wheel 160 via reduction gear 140, and the other through which the motive power is transmitted to first MG 110.

First MG 110 is an alternating current (AC) rotating electric machine, and is a three-phase AC synchronous motor including a U-phase coil, a V-phase coil and a W-phase coil, for example. First MG 110 generates electric power by using the motive power of engine 100 split by power split device 130. For example, when a state of charge (that will also be referred to as "SOC (State of Charge)" hereinafter) of power storage device 150 falls below a predetermined value, engine 100 starts and electric power is generated by first MG 110. The electric power generated by first MG 110 is converted from AC to DC by an inverter (that will be described hereinafter), voltage thereof is adjusted by a converter (that will be described hereinafter), and then the electric power is stored in power storage device 150.

Second MG 120 is an AC rotating electric machine, and is a three-phase AC synchronous motor including a U-phase coil, a V-phase coil and a W-phase coil, for example. Second MG 120 generates driving force by using at least one of the electric power stored in power storage device 150 and the electric power generated by first MG 110. The driving force of second MG 120 is transmitted to drive wheel 160 via reduction gear 140. As a result, second MG 120 assists engine 100 or causes the vehicle to travel by using the driving force from second MG 120. Although drive wheel 160 is shown as a front wheel in FIG. 1, a rear wheel may be driven by second MG 120, instead of the front wheel or together with the front wheel.

It is noted that, at the time of braking and the like of the vehicle, second MG 120 is driven by drive wheel 160 via reduction gear 140, and second MG 120 is operated as a generator. As a result, second MG 120 is operated as a regenerative brake for converting braking energy to electric power. The electric power generated by second MG 120 is stored in power storage device 150.

Power split device 130 is formed of a planetary gear including a sun gear, a pinion gear, a carrier, and a ring gear. The pinion gear engages the sun gear and the ring gear. The carrier rotatably supports the pinion gear, and in addition, is coupled to a crankshaft of engine 100. The sun gear is coupled to a rotation shaft of first MG 110. The ring gear is coupled to a rotation shaft of second MG 120 and reduction gear 140.

Figure 2:
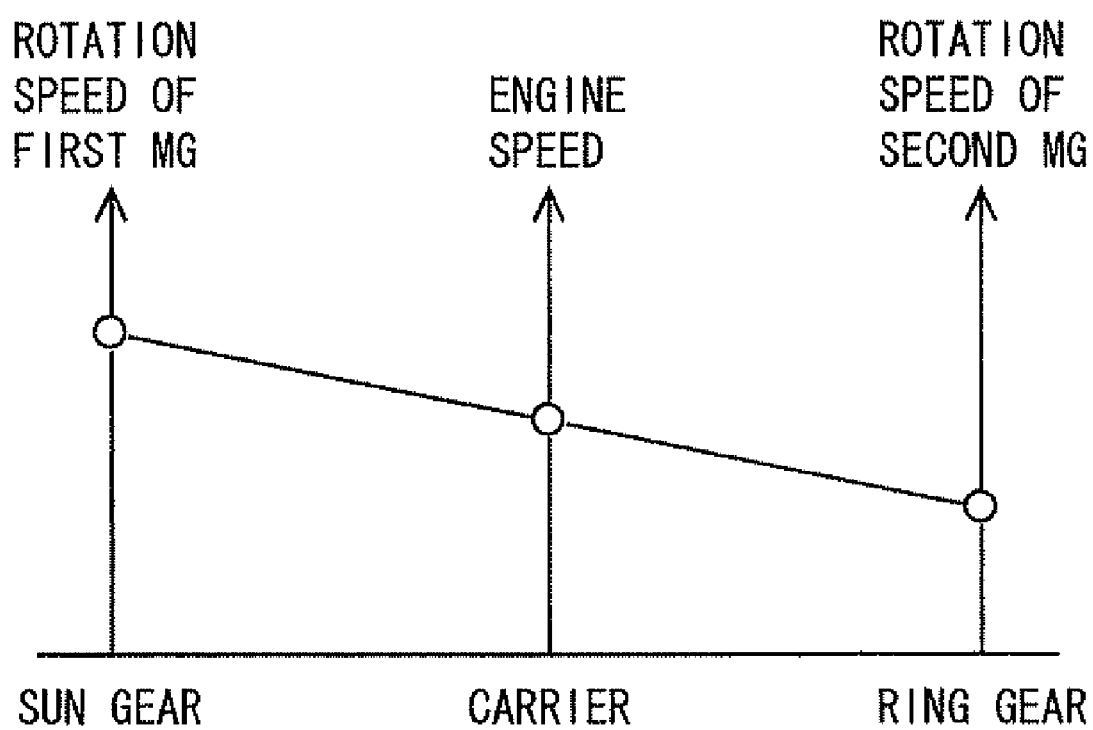
FIG. 2 illustrates a collinear chart of a power split device.

Engine 100, first MG 110 and second MG 120 are coupled with power split device 130 formed of the planetary gear being interposed therebetween, so that the relationship between rotation speeds of engine 100, first MG 110 and second MG 120 is such that they are connected by a straight line in a collinear chart as shown in FIG. 2.

Referring again to FIG. 1, power storage device 150 is a rechargeable DC power supply, and is formed of a secondary battery such as nickel hydride and lithium ion, for example. The voltage of power storage device 150 is, for example, about 200V. In addition to the electric power generated by first MG 110 and second MG 120, electric power supplied from a power supply external to the vehicle is stored in power storage device 150, as will be described hereinafter. It is noted that a large-capacitance capacitor can be employed as power storage device 150, and any electric power buffer may be employed if it can temporarily store the electric power generated by first MG 110 and second MG 120 as well as the electric power from the power supply external to the vehicle and supply the stored electric power to second MG 120.

Engine 100, first MG 110 and second MG 120 are controlled by ECU 170. It is noted that ECU 170 may be divided into a plurality of ECUs for each function. It is noted that a configuration of ECU 170 will be described hereinafter.

Figure 3:
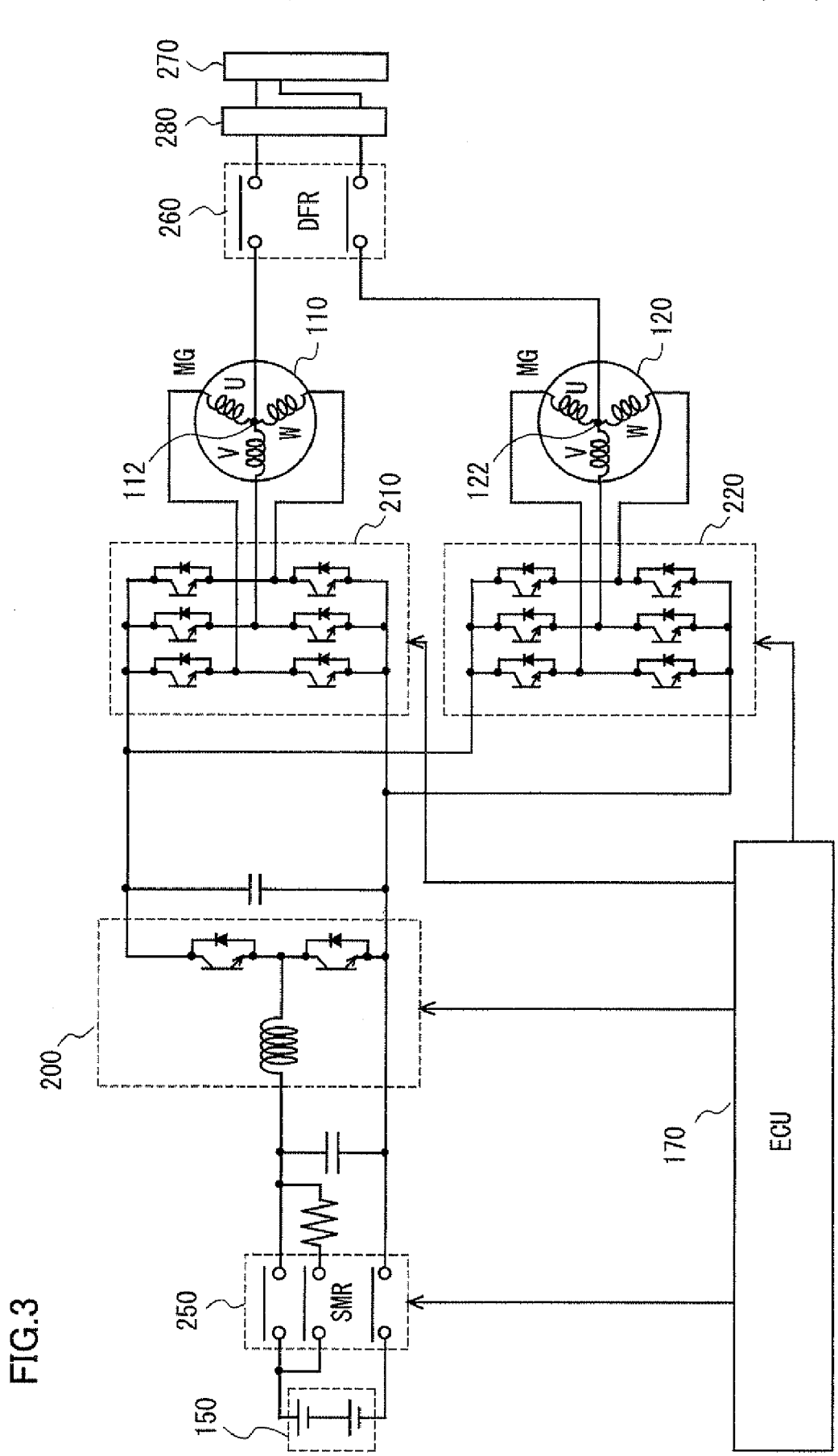
FIG. 3 is an overall configuration diagram of an electrical system in the plug-in hybrid vehicle shown in FIG. 1.

FIG. 3 is an overall configuration diagram of an electrical system in the plug-in hybrid vehicle shown in FIG. 1. Referring to FIG. 3, this electrical system includes power storage device 150, an SMR (System Main Relay) 250, a converter 200, a first inverter 210, a second inverter 220, first MG 110, second MG 120, a DFR (Dead Front Relay) 260, an LC filter 280, and a charging port 270.

SMR 250 is provided between power storage device 150 and converter 200. SMR 250 is a relay for electrically connecting/disconnecting power storage device 150 and the electrical system, and on/off of SMR 250 is controlled by ECU 170. In other words, when the vehicle travels and when power storage device 150 is charged from the power supply external to the vehicle, SMR 250 is turned on, and power storage device 150 is electrically connected to the electrical system.

On the other hand, when the vehicle system stops, SMR 250 is turned off, and power storage device 150 is electrically disconnected from the electrical system.

Converter 200 includes a reactor, two npn-type transistors and two diodes. The reactor has one end connected to the positive electrode side of power storage device 150, and the other end connected to a connection node of the two npn-type transistors. The two npn-type transistors are connected in series, and each npn-type transistor has the diode connected in antiparallel.

It is noted that an IGBT (Insulated Gate Bipolar Transistor), for example, can be used as the npn-type transistor. Furthermore, a power switching element such as a power MOSFET (Metal Oxide Semiconductor Field-Effect Transistor) may be used instead of the npn-type transistor.

When electric power is supplied from power storage device 150 to first MG 110 or second MG 120, converter 200 boosts the electric power discharged from power storage device 150 and supplies the electric power to first MG 110 or second MG 120, based on a control signal from ECU 170. Furthermore, when power storage device 150 is charged with the electric power generated by first MG 110 or second MG 120, converter 200 steps down the electric power supplied from first MG 110 or second MG 120 and outputs the electric power to power storage device 150, based on a control signal from ECU 170.

First inverter 210 includes a U-phase arm, a V-phase arm and a W-phase arm. The U-phase arm, the V-phase arm and the W-phase arm are connected in parallel. Each phase arm includes two npn-type transistors connected in series, and each npn-type transistor has a diode connected in antiparallel. A connection point between the two npn-type transistors in each phase arm is connected to an end of a corresponding coil in first MG 110 that is different from a neutral point 112.

First inverter 210 converts DC electric power supplied from converter 200 to AC electric power, and supplies the converted AC electric power to first MG 110. Furthermore, first inverter 210 converts AC electric power generated by first MG 110 to DC electric power, and supplies the converted DC electric power to converter 200.

Second inverter 220 also has a configuration similar to that of first inverter 210. A connection point between two npn-type transistors in each phase arm is connected to an end of a corresponding coil in second MG 120 that is different from a neutral point 122.

Second inverter 220 converts DC electric power supplied from converter 200 to AC electric power, and supplies the converted AC electric power to second MG 120. Furthermore, second inverter 220 converts AC electric power generated by second MG 120 to DC electric power, and supplies the converted DC electric power to converter 200.

In addition, when power storage device 150 is charged from the power supply external to the vehicle, first inverter 210 and second inverter 220 convert AC electric power provided from the power supply external to the vehicle to neutral point 112 of first MG 110 and neutral point 122 of second MG 120, to DC electric power, based on a control signal from ECU 170, and supply the converted DC electric power to converter 200 by using a method that will be described hereinafter.

DFR 260 is provided between a pair of power lines connected to neutral point 112 of first MG 110 and neutral point 122 of second MG 120 and a pair of power lines connected to LC filter 280. DFR 260 is a relay for electrically connecting/disconnecting charging port 270 and the electrical system, and on/off of DFR 260 is controlled by ECU 170. In other words, when the vehicle travels, DFR 260 is turned off, and charging port 270 is electrically separated from the electrical system. On the other hand, when power storage device 150 is charged from the power supply external to the vehicle, DFR 260 is turned on, and charging port 270 is electrically connected to the electrical system.

LC filter 280 is provided between DFR 260 and charging port 270 and prevents output of a high-frequency noise from the electrical system of the plug-in hybrid vehicle to the power supply external to the vehicle when power storage device 150 is charged from the power supply external to the vehicle.

Charging port 270 serves as an electric power interface for receiving charging electric power from the power supply external to the vehicle, and as a vehicle inlet provided at the vehicle. When power storage device 150 is charged from the power supply external to the vehicle, a connector of a charging cable through which electric power is supplied to the vehicle from the power supply external to the vehicle is inserted into charging port 270.

ECU 170 generates the control signals for driving SMR 250, converter 200, first inverter 210, and second inverter 220, and controls the operation of each of these devices.

Figure 4:
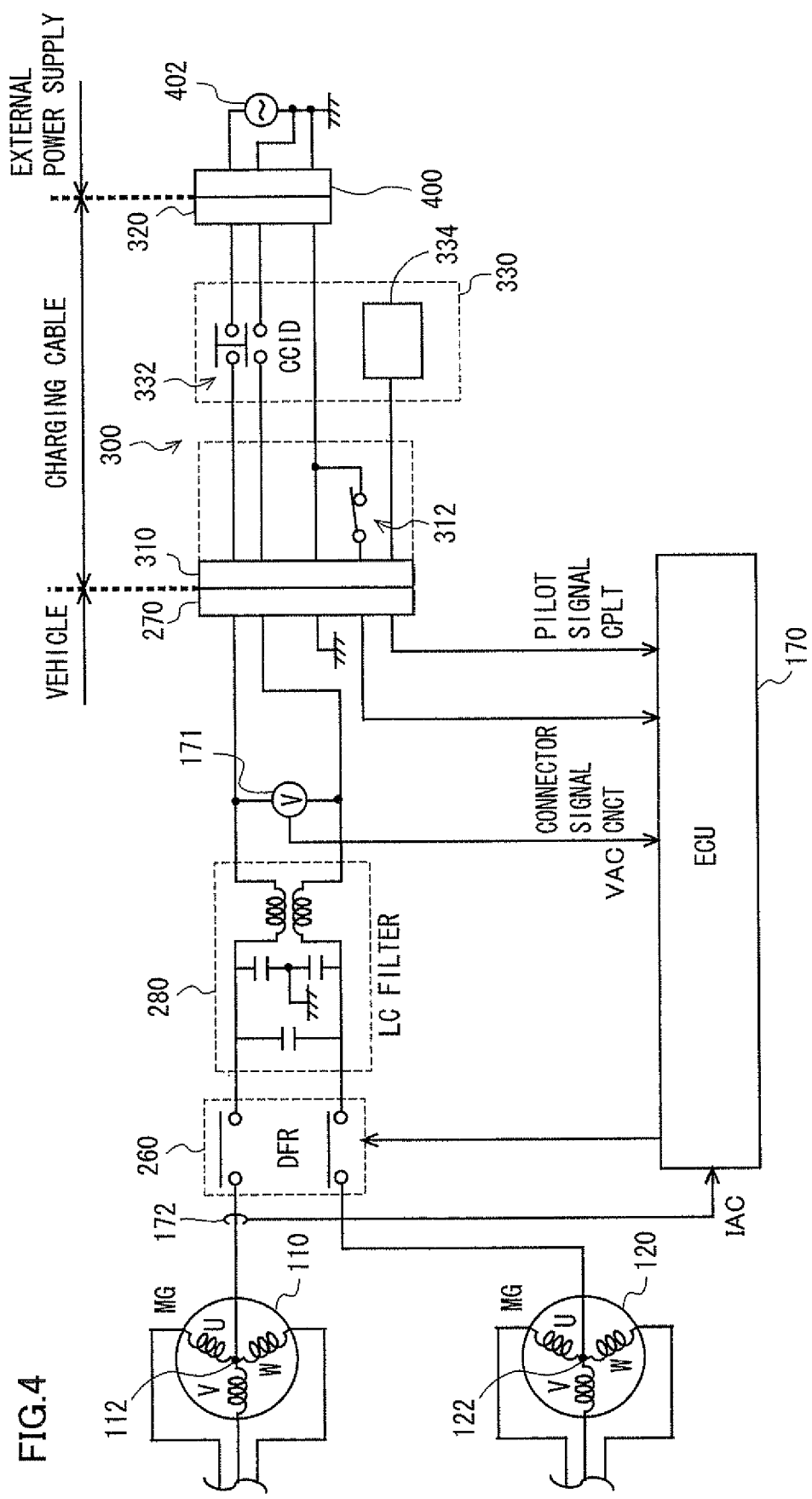
FIG. 4 is a schematic configuration diagram of a portion related to a charging mechanism of the electrical system shown in FIG. 3.

FIG. 4 is a schematic configuration diagram of a portion related to a charging mechanism of the electrical system shown in FIG. 3. Referring to FIG. 4, a charging cable 300 for coupling the plug-in hybrid vehicle and the power supply external to the vehicle includes a connector 310, a plug 320 and a CCID (Charging Circuit Interrupt Device) 330.

Connector 310 is configured to be capable of being inserted into charging port 270 provided at the vehicle. A limit switch 312 is provided at connector 310. When connector 310 is inserted into charging port 270, limit switch 312 is activated, and a connector signal CNCT indicating that connector 310 is inserted into charging port 270 is input to ECU 170.

Plug 320 is connected to a power supply outlet 400 provided at home, for example. AC electric power is supplied from a power supply 402 (for example, a system power supply) to power supply outlet 400.

CCID 330 includes a relay 332 and an EVSE controller 334. Relay 332 is provided in a pair of power lines through which charging electric power is supplied from power supply 402 to the plug-in hybrid vehicle. On/off of relay 332 is controlled by EVSE controller 334. When relay 332 is turned off, a conducting path through which electric power is supplied from power supply 402 to the plug-in hybrid vehicle is disconnected. On the other hand, when relay 332 is turned on, electric power can be supplied from power supply 402 to the plug-in hybrid vehicle.

When plug 320 is connected to power supply outlet 400, EVSE controller 334 is operated by the electric power supplied from power supply 402. EVSE controller 334 generates a pilot signal CPLT sent to ECU 170 of the vehicle through a control pilot line. When connector 310 is inserted into charging port 270 and the potential of pilot signal CPLT is lowered to a prescribed value, EVSE controller 334 causes pilot signal CPLT to oscillate in a prescribed duty cycle (a ratio of a pulse width to an oscillation cycle).

This duty cycle is set based on a rated current that can be supplied from power supply 402 through charging cable 300 to the vehicle.

Figure 5:
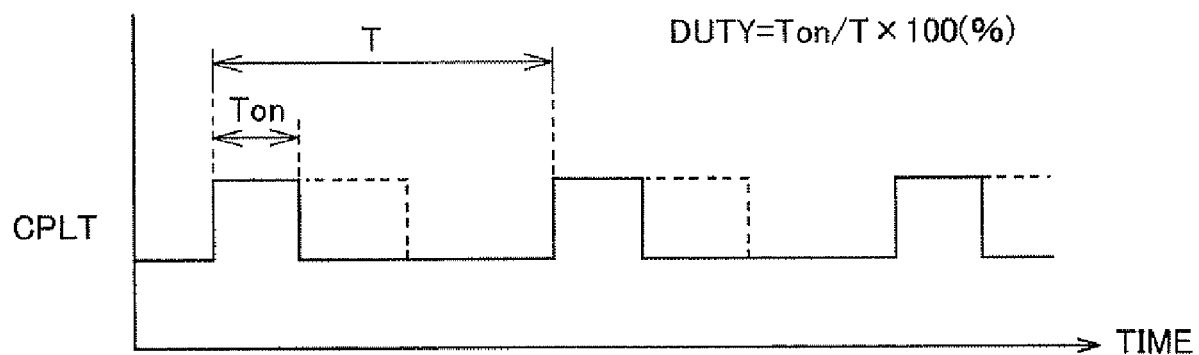
FIG. 5 illustrates a waveform of a pilot signal generated by an EVSE controller shown in FIG. 4.

FIG. 5 illustrates a waveform of pilot signal CPLT generated by EVSE controller 334 shown in FIG. 4. Referring to FIG. 5, pilot signal CPLT oscillates in a prescribed cycle T. Here, a pulse width Ton of pilot signal CPLT is set based on the rated current that can be supplied from power supply 402 through charging cable 300 to the vehicle. The notification of the rated current is provided from EVSE controller 334 to ECU 170 of the vehicle by using pilot signal CPLT, in accordance with the duty indicated by a ratio of pulse width Ton to cycle T.

It is noted that the rated current is defined for each charging cable. Depending on the type of the charging cable, the rated current varies, and therefore, the duty of pilot signal CPLT also varies. ECU 170 of the vehicle receives, through the control pilot line, pilot signal CPLT sent from EVSE controller 334 provided at charging cable 300, and senses the duty of received pilot signal CPLT, so that ECU 170 of the vehicle can sense the rated current that can be supplied from power supply 402 through charging cable 300 to the vehicle.

Referring again to FIG. 4, EVSE controller 334 causes relay 332 to be turned on when preparation for charging is completed on the vehicle side.

Figure 6:
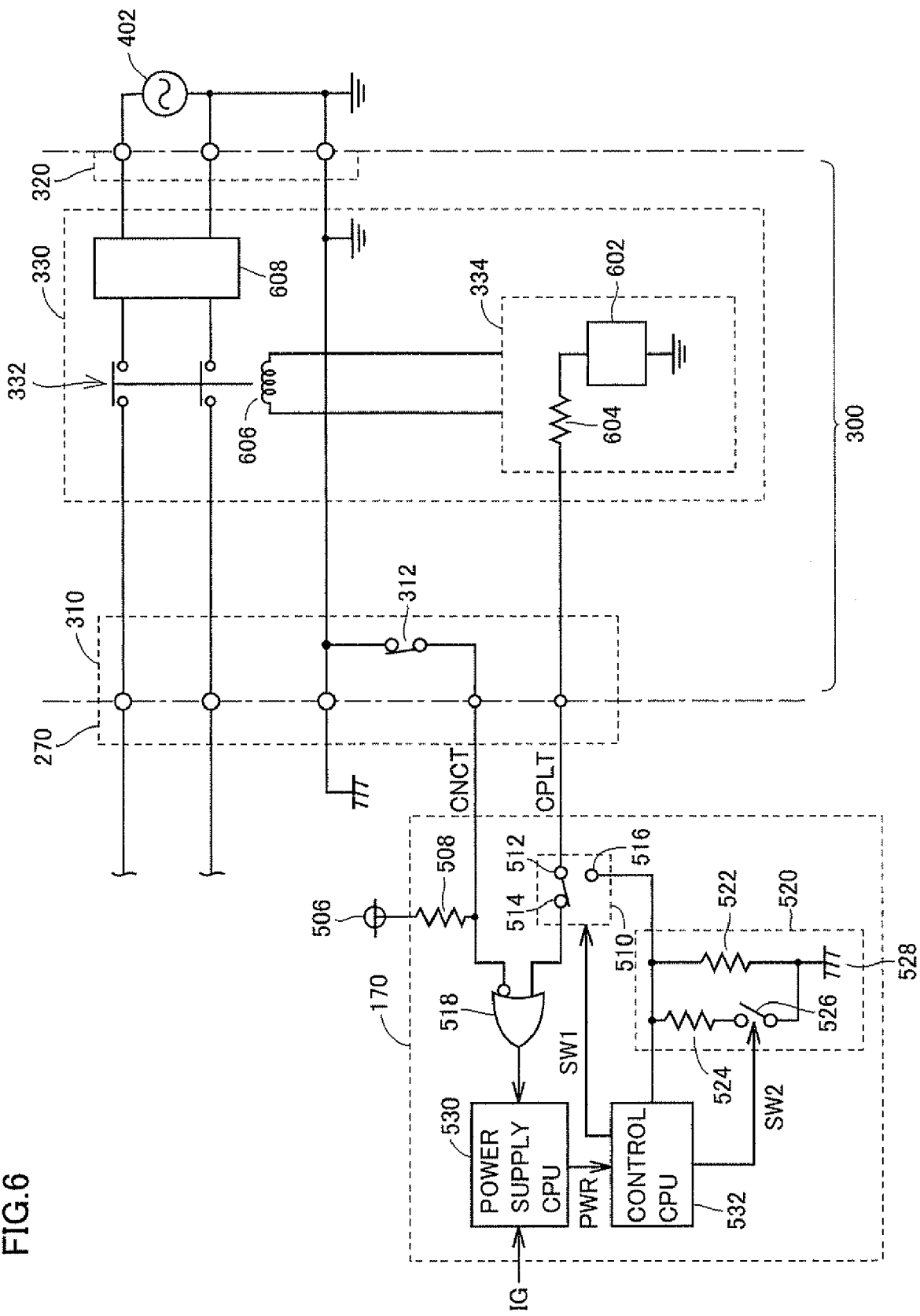
FIG. 6 illustrates the charging mechanism shown in FIG. 4 in more detail.

FIG. 6 illustrates the charging mechanism shown in FIG. 4 in more detail. Referring to FIG. 6, CCID 330 includes an electromagnetic coil 606 and a leakage detector 608, in addition to relay 332 and EVSE controller 334. EVSE controller 334 includes an oscillator 602 and a resistance element 604.

Oscillator 602 is operated by the electric power supplied from power supply 402. Oscillator 602 outputs a non-oscillating signal when the output potential of resistance element 604 is around a prescribed potential V1 (for example, 12V), and outputs a signal that oscillates at a prescribed frequency (for example, 1 kHz) and duty cycle, when the output potential of resistance element 604 is lowered from V1. In other words, EVSE controller 334 does not cause pilot signal CPLT to oscillate when the potential of pilot signal CPLT is around V1, and EVSE controller 334 causes pilot signal CPLT to oscillate at the prescribed frequency and duty cycle when the potential of pilot signal CPLT is lowered from V1. It is noted that the potential of pilot signal CPLT is manipulated by switching a resistance value on the ECU 170 side as will be described hereinafter. In addition, the duty cycle is set based on the rated current that can be supplied from power supply 402 through charging cable 300 to the vehicle as described above.

In addition, EVSE controller 334 supplies a current to electromagnetic coil 606 when the potential of pilot signal CPLT is around a prescribed potential V3 (for example, 6V). When the current is supplied from EVSE controller 334, electromagnetic coil 606 generates electromagnetic force and relay 332 is turned on.

Leakage detector 608 is provided at a pair of power lines through which charging electric power is supplied from power supply 402 to the plug-in hybrid vehicle, and detects the presence or absence of leakage. Specifically, leakage detector 608 detects the equilibrium of the current flowing through the pair of power lines in the opposite direction, and senses the occurrence of leakage when the equilibrium is broken. It is noted that, although not specifically shown, when the leakage is detected by leakage detector 608, electric power supply to electromagnetic coil 606 is interrupted and relay 332 is turned off.

On the other hand, ECU 170 includes a switching circuit 510, an OR circuit 518, a resistance circuit 520, a power supply CPU (Control Processing Unit) 530, a control CPU 532, and a resistance element 508.

When connector 310 is being inserted into charging port 270, switching circuit 510 receives pilot signal CPLT from EVSE controller 334. When a switching signal SW1 from control CPU 532 is inactive, switching circuit 510 outputs pilot signal CPLT to OR circuit 518 by electrically connecting a terminal 512 to a terminal 514. On the other hand, when switching signal SW1 is rendered active, switching circuit 510 outputs pilot signal CPLT to resistance circuit 520 by electrically connecting terminal 512 to a terminal 516. It is noted that, when the vehicle system stops, control CPU 532 stops and switching signal SW1 is rendered inactive, and switching circuit 510 electrically connects terminal 512 to terminal 514.

OR circuit 518 receives the output from switching circuit 510 and an inversion signal of connector signal CNCT at an input terminal, implements the logical OR operation, and outputs the result of the operation to power supply CPU 530.

At this time, a voltage is applied from an auxiliary power supply node 506 through resistance element 508 to a connector signal line through which connector signal CNCT is transmitted. When connector 310 is inserted into charging port 270, limit switch 312 is turned on and the potential of the connector signal line is lowered.

Accordingly, when connector 310 is inserted into charging port 270 or when OR circuit 518 receives pilot signal CPLT from switching circuit 510, OR circuit 518 renders an output signal output to power supply CPU 530 active.

Power supply CPU 530 receives a signal IG that is rendered active in accordance with the system activation operation by a user (for example, the operation of pivoting an ignition key to the ON position, the operation of turning on a start switch, and the like), as well as the output signal from OR circuit 518. When any one of signal IG and the output signal from OR circuit 518 is rendered active, power supply CPU 530 is activated, and outputs an activation signal PWR to each equipment including control CPU 532. Thereby, the vehicle system is activated.

It is noted that power supply CPU 530 has a slow operation cycle and the operation cycle of power supply CPU 530 is longer than the oscillation cycle of pilot signal CPLT in order to reduce electric power consumption during standby. Accordingly, power supply CPU 530 cannot detect oscillating pilot signal CPLT. When pilot signal CPLT is being output to the power supply CPU 530 side by switching circuit 510, however, the potential of pilot signal CPLT is maintained at around V1 and pilot signal CPLT does not oscillate. Therefore, power supply CPU 530 can detect pilot signal CPLT.

Resistance circuit 520 includes resistance elements 522, 524, a relay 526 and a ground node 528. Resistance element 522 is connected between ground node 528 and a signal line placed between terminal 516 of switching circuit 510 and control CPU 532. Resistance element 524 and relay 526 are connected in series between the above signal line and ground node 528, and are connected in parallel with resistance element 522. Relay 526 is turned on when a switching signal SW2 from control CPU 532 is rendered active.

When pilot signal CPLT is being output to resistance circuit 520 by switching circuit 510, this resistance circuit 520 switches the potential of pilot signal CPLT in accordance with switching signal SW2. In other words, when pilot signal CPLT is being output to resistance circuit 520, the potential of pilot signal CPLT is lowered to a prescribed potential V2 (for example, 9V) due to resistance element 522 if relay 526 is in the OFF state. If relay 526 is in the ON state, the potential of pilot signal CPLT is further lowered to prescribed potential V3 (for example, 6V) due to resistance element 524.

Control CPU 532 is activated in accordance with activation signal PWR from power supply CPU 530 and performs various control related to travel of the vehicle as well as various control related to charging of power storage device 150 from power supply 402. When power storage device 150 is charged from power supply 402, control CPU 532 renders switching signal SW1 output to switching circuit 510 active in accordance with the activation by activation signal PWR. Control CPU 532 detects the rated current that can be supplied from power supply 402 to the plug-in hybrid vehicle, based on pilot signal CPLT received from switching circuit 510 when switching signal SW1 is rendered active.

When the rated current is detected and the preparation for charging of power storage device 150 from power supply 402 is completed, control CPU 532 renders switching signal SW2 output to relay 526 of resistance circuit 520 active. Thereafter, control CPU 532 causes DFR 260 (not shown) to be turned on and controls first inverter 210, second inverter 220 and converter 200 (all not shown), and thereby, charging of power storage device 150 from power supply 402 is controlled.

In this plug-in hybrid vehicle, when any one of signal IG and the output signal from OR circuit 518 is rendered active, power supply CPU 530 is activated. In other words, the vehicle system is activated in accordance with the system activation operation by the user when travel of the vehicle is requested, and the vehicle system is activated in accordance with connector signal CNCT or pilot signal CPLT when charging of power storage device 150 from power supply 402 is requested.

Here, if pilot signal CPLT oscillates, pilot signal CPLT cannot be used as an activation trigger in power supply CPU 530 because the oscillation cycle of pilot signal CPLT is shorter than the operation cycle of power supply CPU 530.

On the other hand, when the potential of pilot signal CPLT is around V1 (for example, 12V), EVSE controller 334 does not cause pilot signal CPLT to oscillate, and when the potential of pilot signal CPLT is lowered from V1, EVSE controller 334 causes pilot signal CPLT to oscillate.

In the present embodiment, the potential of pilot signal CPLT can be switched by vehicle-mounted switching circuit 510 and resistance circuit 520, and oscillation/non-oscillation of pilot signal CPLT by EVSE controller 334 can be remotely controlled on the vehicle side. In other words, by switching an output destination of pilot signal CPLT to the power supply CPU 530 side by switching circuit 510 and avoiding lowering of the potential of pilot signal CPLT caused by resistance circuit 520, pilot signal CPLT can be manipulated to the non-oscillating state. On the other hand, by switching the output destination of pilot signal CPLT to resistance circuit 520 by switching circuit 510 and lowering the potential of pilot signal CPLT by resistance circuit 520, pilot signal CPLT can be manipulated to the oscillating state.

In the present embodiment, until the vehicle system is activated, the output destination of pilot signal CPLT is set to the power supply CPU 530 side by switching circuit 510, and thereby, non-oscillating pilot signal CPLT is used as the activation trigger for the vehicle system. After the vehicle system is activated, the output destination of pilot signal CPLT is set to resistance circuit 520 by switching circuit 510, and thereby, the rated current is sensed based on oscillating pilot signal CPLT.

In the present embodiment, the vehicle system is activated in accordance with connector signal CNCT or pilot signal CPLT when charging of power storage device 150 from power supply 402 is requested. Such a configuration enables the vehicle system to be activated again after recovery from the power failure (it is noted that this is based on the premise that the vehicle system stops during the power failure).

In other words, if only connector signal CNCT is used as the activation trigger for the vehicle system, connector signal CNCT is not generated after recovery from the power failure and the vehicle system cannot be activated again because connector 310 remains inserted into charging port 270 during the power failure. On the other hand, in the present embodiment, even if connector signal CNCT is not generated, the vehicle system can be activated in accordance with pilot signal CPLT. When pilot signal CPLT is output from EVSE controller 334 upon recovery from the power failure, pilot signal CPLT is used as the activation trigger to activate power supply CPU 530, and the vehicle system is activated again.

Figure 7:
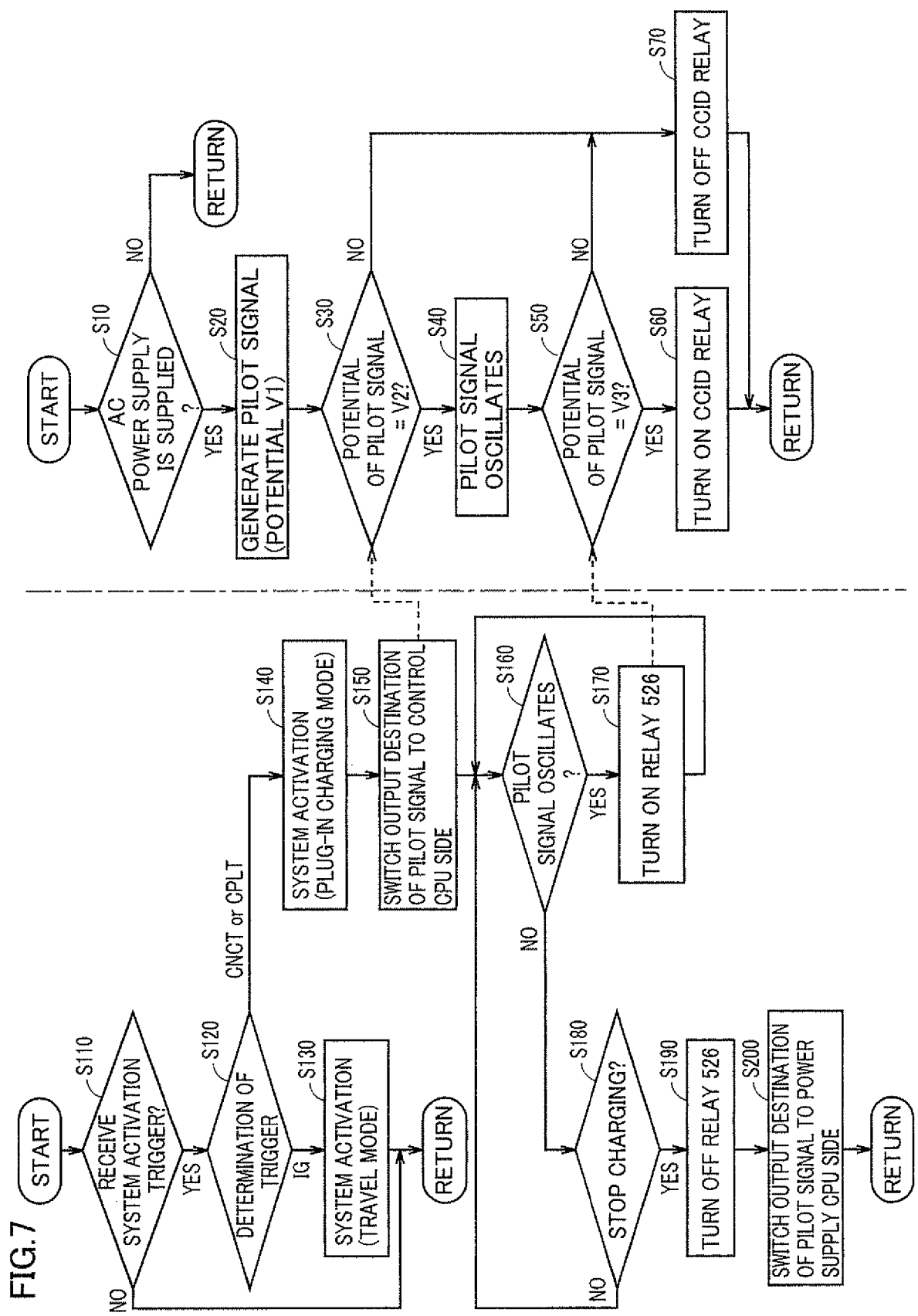
FIG. 7 is an operation flowchart of a CCID and an ECU shown in FIG. 6.

FIG. 7 is an operation flowchart of CCID 330 and ECU 170 shown in FIG. 6. Referring to FIGS. 7 and 6, in CCID 330, if electric power is supplied from power supply 402 to CCID 330 (YES in step S10), EVSE controller 334 generates pilot signal CPLT (potential V1) (step S20). If the potential of pilot signal CPLT is lowered to V2 (YES in step S30), EVSE controller 334 causes pilot signal CPLT to oscillate (step S40). If the potential of pilot signal CPLT is further lowered to V3 (YES in step S50), EVSE controller 334 supplies a current to electromagnetic coil 606 and relay 332 is turned on (step S60).

On the other hand, if the potential of pilot signal CPLT is not lowered to V3 in step S50 (NO in step S50), EVSE controller 334 does not supply the current to electromagnetic coil 606 and relay 332 is turned of (step S70). In addition, if the potential of pilot signal CPLT is not lowered to V2 in step S30 (NO in step S30), relay 332 is also turned off (step S70).

In ECU 170, power supply CPU 530 determines whether or not the activation trigger for the vehicle system is received (step S110). This activation trigger is either signal IG or the output signal of OR circuit 518 as described above. If it is determined that the activation trigger is received (YES in step S110), power supply CPU 530 determines the type of the activation trigger (step S120).

If the activation trigger is signal IG ("IG" in step S120), power supply CPU 530 activates the vehicle system in "travel mode" (step S130). On the other hand, if the activation trigger is the output signal of OR circuit 518 ("CNCT or CPLT" in step S120), power supply CPU 530 activates the vehicle system in "plug-in charging mode" (step S140). It is noted that the processes in these steps S130 and S140 may be performed in control CPU 532.

If the vehicle system is activated in "plug-in charging mode," control CPU 532 renders switching signal SW1 output to switching circuit 510 active and switches the output destination of pilot signal CPLT from the power supply CPU 530 side (OR circuit 518) to the control CPU 532 side (resistance circuit 520) (step S150). It is noted that, as a result of this switching, the potential of pilot signal CPLT is lowered to potential V2 due to resistance element 522 of resistance circuit 520, and therefore, pilot signal CPLT oscillates (step S40).

Then, control CPU 532 determines whether or not pilot signal CPLT starts to oscillate (step S160). If the oscillation of pilot signal CPLT is detected (YES in step S160), control CPU 532 detects the rated current that can be supplied from power supply 402 through charging cable 300 to the plug-in hybrid vehicle, based on the duty of pilot signal CPLT. When the preparation for charging of power storage device 150 is completed, control CPU 532 renders switching signal SW2 active and causes relay 526 of resistance circuit 520 to be turned on (step S170). Then, the potential of pilot signal CPLT is further lowered to potential V3 and relay 332 is turned on in CCID 330 (step S60).

If it is determined that pilot signal CPLT does not oscillate in step S160 (NO in step S160), control CPU 532 determines whether or not to stop charging (step S180). Whether or not to stop charging may be determined based on an instruction from the user or based on whether or not the non-oscillating state has continued for a prescribed time period.

If it is determined in step S180 that charging stops (YES in step S180), control CPU 532 renders switching signal SW2 inactive and causes relay 526 of resistance circuit 520 to be turned off (step S190). Then, the potential of pilot signal CPLT is set to V2 and relay 332 is turned off in CCID 330. Thereafter, control CPU 532 renders switching signal SW1 inactive and switches the output destination of pilot signal CPLT from the control CPU 532 side (resistance circuit 520) to the power supply CPU 530 side (OR circuit 518) (step S200).

Figure 8:
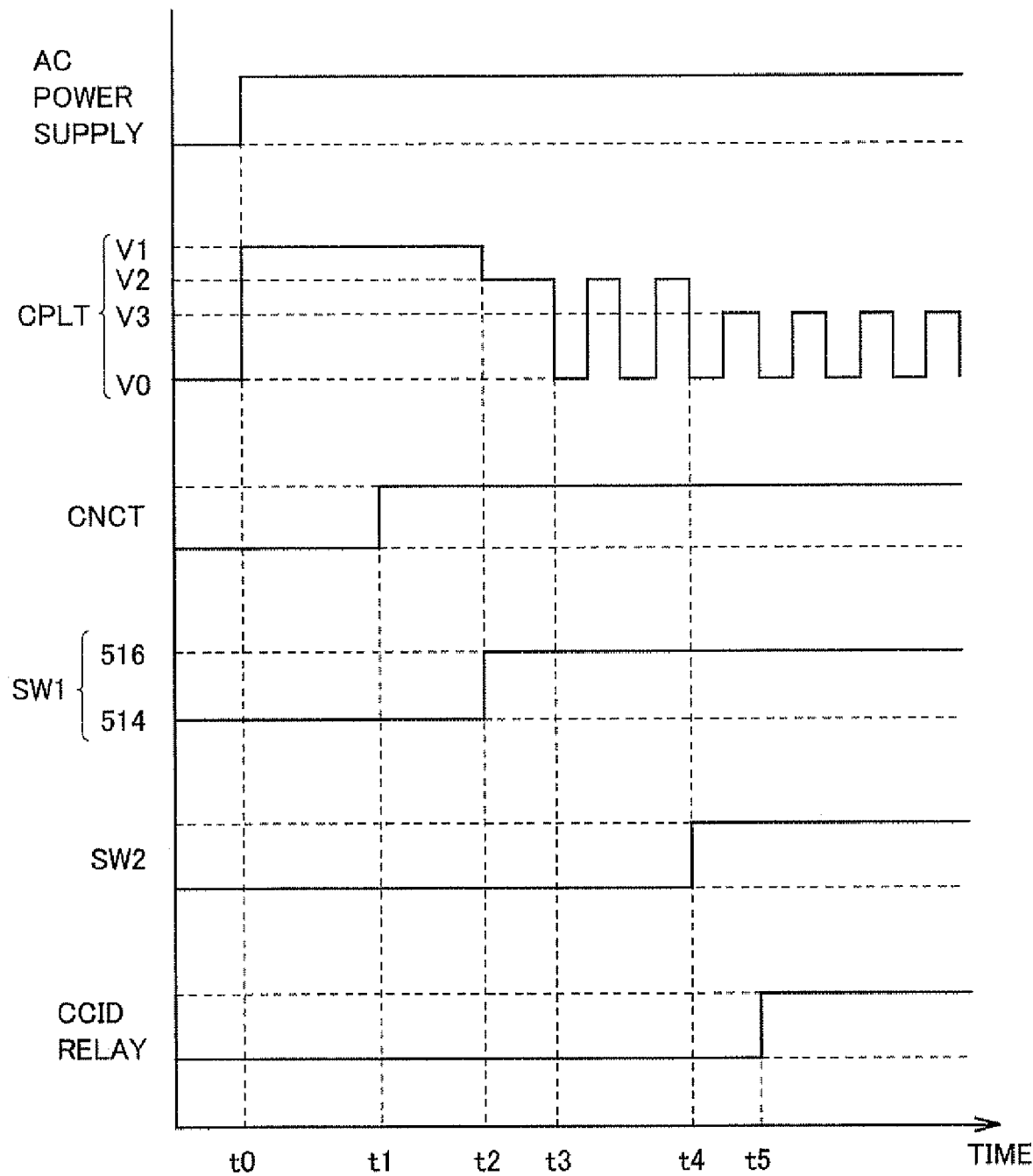
FIG. 8 is a timing chart of main signals when charging of the plug-in hybrid vehicle from a power supply external to the vehicle starts.

FIG. 8 is a timing chart of the main signals when charging of the plug-in hybrid vehicle from power supply 402 external to the vehicle starts. Referring to FIGS. 8 and 6, when plug 320 of charging cable 300 is connected to the power supply outlet of power supply 402 at time t0, electric power is received from power supply 402 and EVSE controller 334 generates pilot signal CPLT.

It is noted that, at this point, connector 310 of charging cable 300 is not inserted into charging port 270 on the vehicle side, the potential of pilot signal CPLT is V1 (for example, 12V), and pilot signal CPLT does not oscillate. In addition, terminal 512 is electrically connected to terminal 514 in switching circuit 510 of ECU 170.

When connector 310 is inserted into charging port 270 at time t1, connector signal CNCT is generated. Then, this connector signal CNCT or pilot signal CPLT is used as the activation trigger to activate power supply CPU 530. Thereafter, when the vehicle system is activated, control CPU 532 renders switching signal SW1 active at time t2.

When switching signal SW1 is rendered active at time t2, switching circuit 510 outputs pilot signal CPLT to the control CPU 532 side (resistance circuit 520) by electrically connecting terminal 512 to terminal 516. Then, the potential of pilot signal CPLT is lowered to V2 (for example, 9V) due to resistance element 522 of resistance circuit 520.

When the potential of pilot signal CPLT is lowered to V2, EVSE controller 334 causes pilot signal CPLT to oscillate at time t3. Then, the rated current is detected in control CPU 532 based on the duty of pilot signal CPLT, and when the preparation for charging control is completed, control CPU 532 renders switching signal SW2 active at time t4. Then, the potential of pilot signal CPLT is further lowered to V3 (for example, 6V) due to resistance element 524 of resistance circuit 520.

When the potential of pilot signal CPLT is lowered to V3, a current is supplied from EVSE controller 334 to electromagnetic coil 606 and relay 332 of CCID 330 is turned on at time t5. Thereafter, although not specifically shown, DFR 260 is turned on and power storage device 150 is charged from power supply 402.

Figure 9:
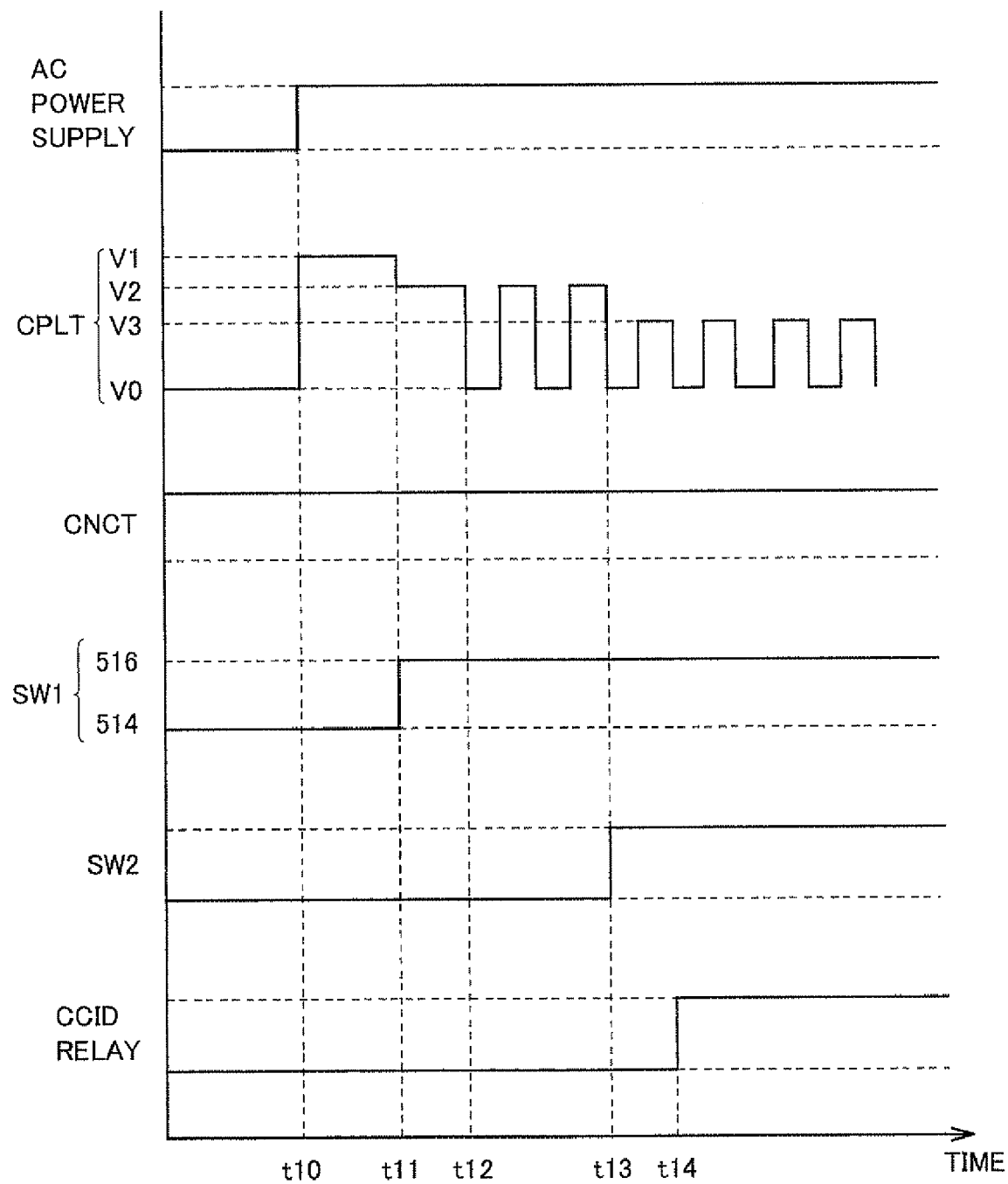
FIG. 9 is a timing chart of the main signals when charging restarts after recovery from a power failure.

FIG. 9 is a timing chart of the main signals when charging restarts after recovery from the power failure. Referring to FIGS. 9 and 6, it is assumed that the vehicle recovers from the power failure at time t10. When the vehicle recovers from the power failure, EVSE controller 334 receives electric power from power supply 402 and generates pilot signal CPLT.

Here, unlike the case where charging starts as shown in FIG. 8, connector 310 of charging cable 300 remains inserted into charging port 270 on the vehicle side during the power failure. Therefore, it is impossible to use connector signal CNCT as the activation trigger for power supply CPU 530 when charging restarts. Since pilot signal CPLT is, however, generated upon recovery from the power failure and terminal 512 is electrically connected to terminal 514 in switching circuit 510 due to the power failure, pilot signal CPLT is used as the activation trigger to activate power supply CPU 530. Thereafter, when the vehicle system is activated, control CPU 532 renders switching signal SW1 active at time t11.

It is noted that the operation after time t11 is the same as the operation after time t2 in the case where charging starts as shown in FIG. 8. As described above, when charging restarts after recovery from the power failure, pilot signal CPLT is used as the activation trigger to activate the vehicle system, and charging of power storage device 150 from power supply 402 can restart.

Figure 10:
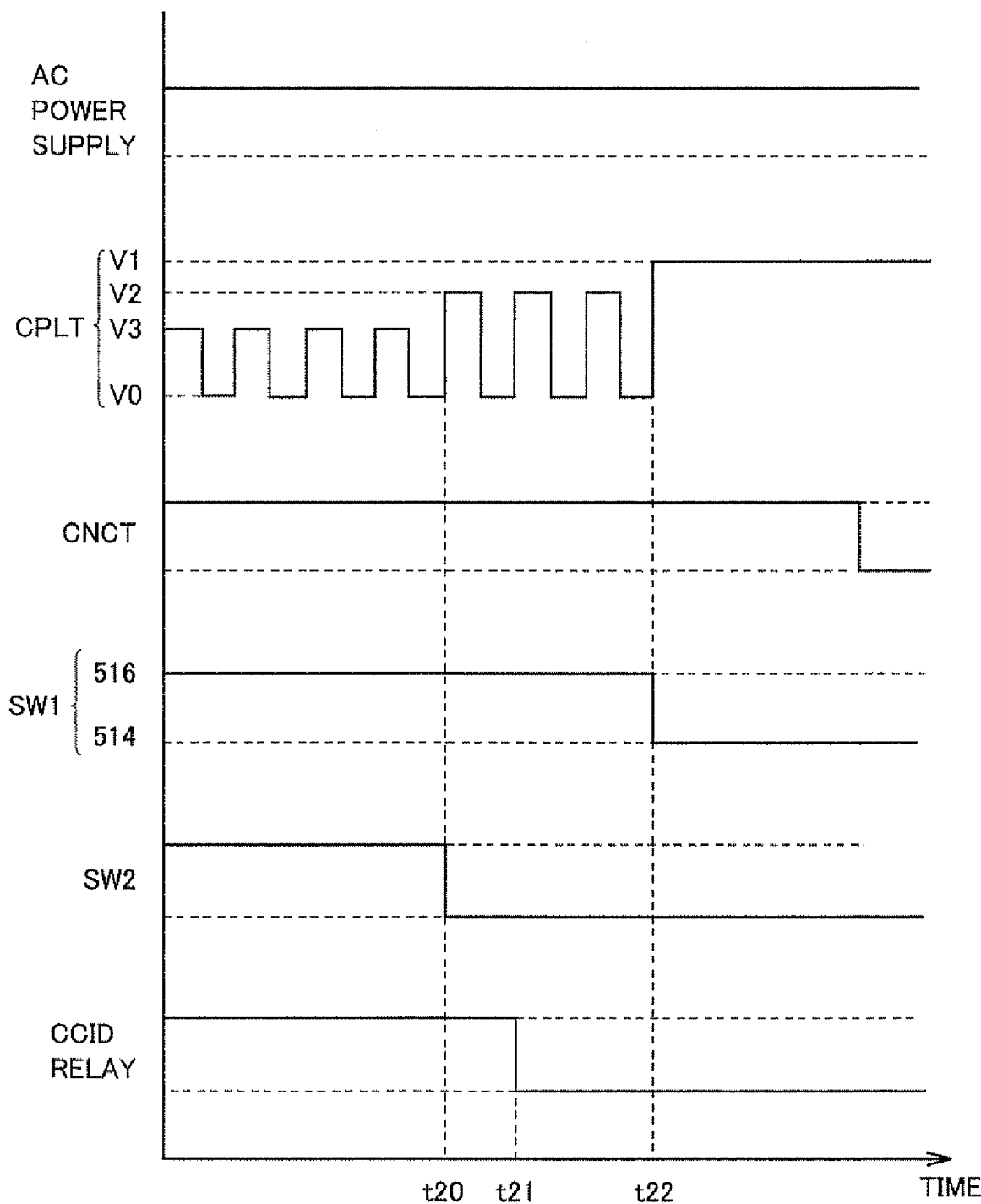
FIG. 10 is a timing chart of the main signals when charging ends.

FIG. 10 is a timing chart of the main signals when charging ends. Referring to FIG. 10, at time t20, it is determined that charging ends, and control CPU 532 renders switching signal SW2 inactive. Then, the potential of pilot signal CPLT rises from V3 to V2, and in accordance therewith, relay 332 of CCID 330 is turned off at time t21.

Thereafter, control CPU 532 renders switching signal SW1 inactive at time t22. Then, in preparation for next charging, the output destination of pilot signal CPLT is switched from the control CPU 532 side (resistance circuit 520) to the power supply CPU 530 side (OR circuit 518) in switching circuit 510. As a result, the potential of pilot signal CPLT rises from V2 to V1.

The system activation of the plug-in hybrid vehicle when charging starts and when charging restarts after recovery from the power failure is implemented in the above-described manner.

Next, the operation of first inverter 210 and second inverter 220 when power storage device 150 is charged from power supply 402 will be described.

Figure 11:
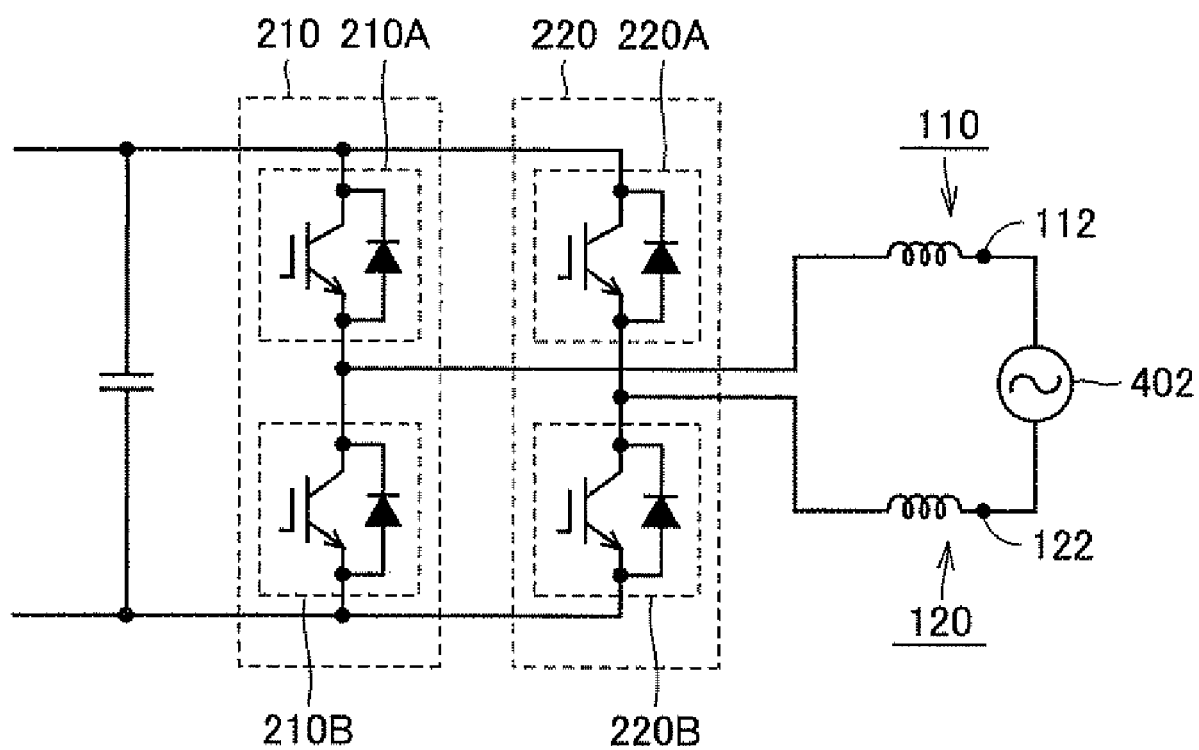
FIG. 11 illustrates a zero-phase equivalent circuit of first and second inverters as well as first and second MGs shown in FIG. 3.

FIG. 11 illustrates a zero-phase equivalent circuit of first and second inverters 210 and 220 as well as first and second MGs 110 and 120 shown in FIG. 3. Each of first inverter 210 and second inverter 220 is formed of a three-phase bridge circuit as shown in FIG. 3, and there are eight patterns of on/off combinations of six switching elements in each inverter. In the two of the eight switching patterns, an interphase voltage becomes zero, and such a voltage state is referred to as a zero voltage vector. The zero voltage vector can be understood that the three switching elements of the upper arm are in the same switching state (all on or off), and similarly, the three switching elements of the lower arm are in the same switching state.

During charging of power storage device 150 from power supply 402 external to the vehicle, the zero voltage vector is controlled in at least one of first and second inverters 210 and 220, based on a zero-phase voltage command generated by a voltage VAC detected by a voltage sensor 171 (FIG. 3) as well as the rated current notified from charging cable 300 by pilot signal CPLT. Therefore, in this FIG. 11, the three switching elements of the upper arm of first inverter 210 are collectively shown as an upper arm 210A, and the three switching elements of the lower arm of first inverter 210 are collectively shown as a lower arm 210B. Similarly, the three switching elements of the upper arm of second inverter 220 are collectively shown as an upper arm 220A, and the three switching elements of the lower arm of second inverter 220 are collectively shown as lower arm 220B.

As shown in FIG. 11, this zero-phase equivalent circuit can be regarded as a single-phase PWM converter that accepts an input of the single-phase AC electric power provided from power supply 402 to neutral point 112 of first MG 110 and neutral point 122 of second MG 120. Accordingly, by changing the zero voltage vector in at least one of first and second inverters 210 and 220 based on the zero-phase voltage command and controlling switching of first and second inverters 210 and 220 so that first and second inverters 210 and 220 operate as the arms of the single-phase PWM converter, the AC electric power supplied from power supply 402 can be converted to DC electric power and power storage device 150 can be charged.

As described above, in the present embodiment, the vehicle system is activated in accordance with signal IG that is rendered active in accordance with the system activation operation by the user, when travel of the vehicle is requested. The vehicle system is activated in accordance with any one of connector signal CNCT and pilot signal CPLT when charging of power storage device 150 from power supply 402 is requested. Therefore, the vehicle system is activated by pilot signal CPLT even when connector signal CNCT is abnormal or is not generated (at the time of recovery from the power failure and the like). Here, pilot signal CPLT is a pulse signal. Until the vehicle system is activated, however, pilot signal CPLT is provided in a non-pulsed manner. Therefore, even if the operation cycle of power supply CPU 530 is longer than the oscillation cycle of pilot signal CPLT, power supply CPU 530 can recognize pilot signal CPLT.

Thus, according to the present embodiment, the vehicle system can be reliably activated when power storage device 150 is charged from power supply 402. In addition, the vehicle system can be activated in accordance with any one of connector signal CNCT and pilot signal CPLT. Therefore, even when connector signal CNCT is not generated after recovery from the power failure, the vehicle system can be activated in accordance with pilot signal CPLT. Furthermore, the vehicle system can be activated even when connector signal CNCT is abnormal, and the activation of the vehicle system enables the abnormality in connector signal CNCT to be sensed.

[Modification]

In this modification, an abnormality in pilot signal CPLT is detected along with the system activation process when charging starts or when charging restarts after recovery from the power failure.

Figure 12:
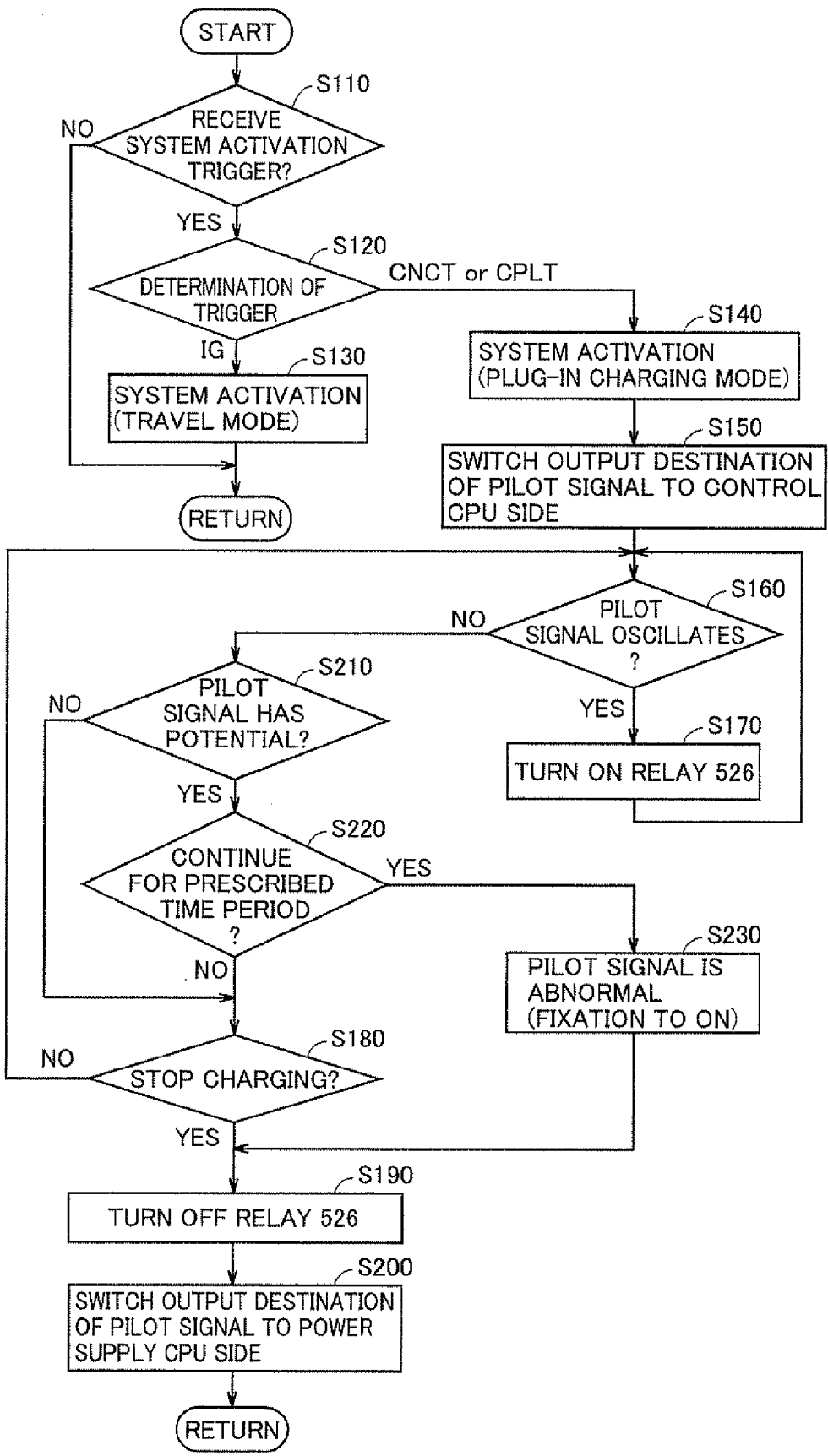
FIG. 12 is an operation flowchart of an ECU in a modification.

FIG. 12 is an operation flowchart of ECU 170 in this modification. Referring to FIG. 12, this flowchart further includes steps S210, S220 and S230, in addition to the steps in the operation flowchart of ECU 170 shown in FIG. 7.

In other words, if it is determined in step S160 that pilot signal CPLT does not oscillate, control CPU 532 determines whether or not pilot signal CPLT has a potential (step S210). If it is determined that pilot signal CPLT has the potential (YES in step S210), control CPU 532 determines whether or not a state in which pilot signal CPLT does not oscillate and pilot signal CPLT has the potential has continued for a prescribed time period (step S220).

If it is determined in step S220 that the state has continued for the prescribed time period (YES in step S220), control CPU 532 determines that pilot signal CPLT is abnormal (fixation to ON) and a diagnosis thereof is stored (step S230). In other words, if pilot signal CPLT has the potential, but pilot signal CPLT does not oscillate, an abnormality that pilot signal CPLT is abnormal is detected, which is distinguished from the time when charging cable 300 is not connected to power supply 402 or the time when the power failure occurs.

If it is determined in step S210 that pilot signal CPLT does not have a potential (NO in step S210), or if it is determined in step S220 that the state does not have continued for the prescribed time period (NO in step S220), control CPU 532 transfers the process to step S180.

As described above, according to the present modification, an abnormality in pilot signal CPLT can be detected, which is distinguished from the time when charging cable 300 is not connected to power supply 402 or the time when the power failure occurs.

In the above embodiment, power storage device 150 is charged by providing neutral point 112 of first MG 110 and neutral point 122 of second MG 120 with the charging electric power supplied from power supply 402 and operating first and second inverters 210 and 220 as the single-phase PWM converter. A charger designed for charging of power storage device 150 from power supply 402 may, however, be provided separately.

Figure 13:
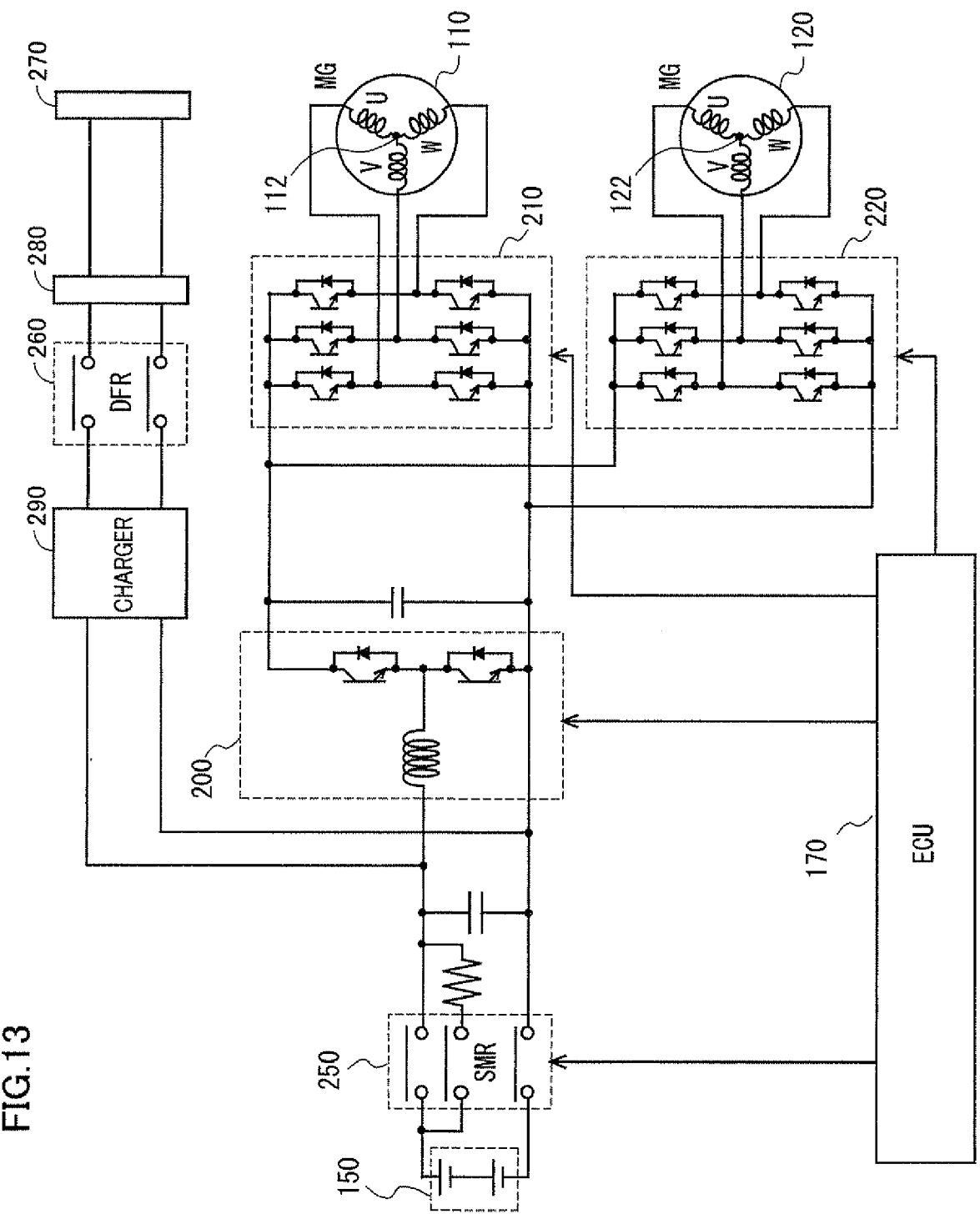
FIG. 13 is an overall configuration diagram of an electrical system in a plug-in hybrid vehicle on which a charger designed for charging of a power storage device from a power supply is mounted.

FIG. 13 is an overall configuration diagram of an electrical system in a plug-in hybrid vehicle on which the charger designed for charging of power storage device 150 from power supply 402 is mounted. Referring to FIG. 13, this electrical system further includes a charger 290, as compared with the electrical system shown in FIG. 3. Charger 290 is connected to a power line between SMR 250 and converter 200, and charging port 270 is connected on the input side of charger 290 with DFR 260 and LC filter 280 interposed therebetween. During charging of power storage device 150 from power supply 402, charger 290 converts charging electric power supplied from power supply 402 to a voltage level of power storage device 150 and outputs the charging electric power to power storage device 150, based on a control signal from ECU 170, to charge power storage device 150.

Figure 14:
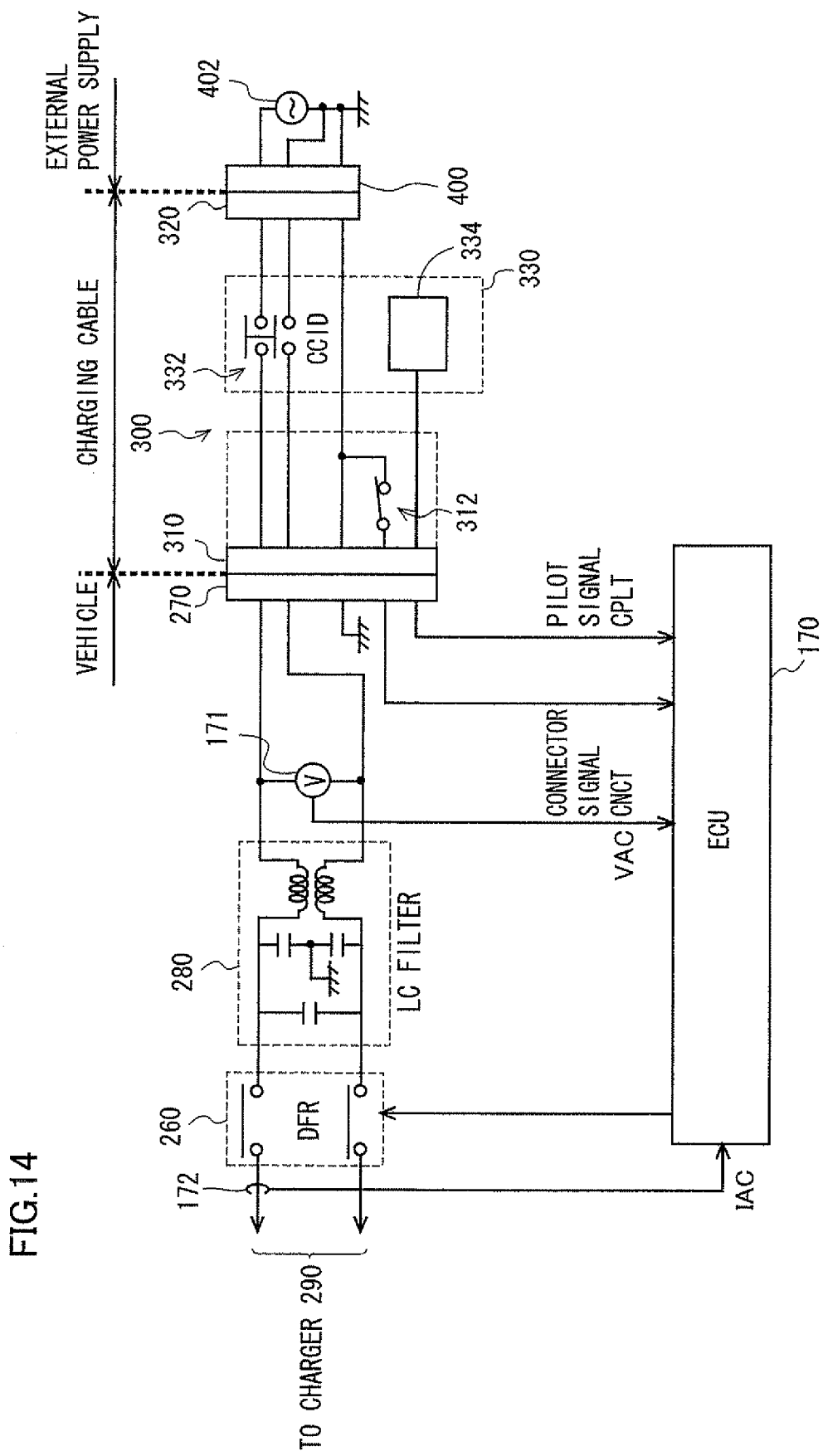
FIG. 14 is a schematic configuration diagram of a portion related to a charging mechanism of the electrical system shown in FIG. 13.

It is noted that, as shown in FIG. 14, a portion related to a charging mechanism of the electrical system shown in FIG. 13 has the same configuration as that of the charging mechanism in the above embodiment shown in FIG. 4.

It is noted that, in the above embodiment, a series/parallel-type hybrid vehicle has been described, in which motive power of engine 100 is distributed into drive wheel 160 and first MG 110 by employing power split device 130. The present invention, however, is also applicable to other types of hybrid vehicles. In other words, the present invention is also applicable to, for example, a so-called series-type hybrid vehicle using engine 100 only for driving first MG 110 and generating the driving force of the vehicle by employing only second MG 120, a hybrid vehicle in which only regenerative energy among kinetic energy generated by engine 100 is recovered as electric energy, a motor-assisted-type hybrid vehicle in which an engine is used as a main power source and a motor assists the engine as required, and the like.

Furthermore, the present invention is also applicable to a hybrid vehicle that does not include converter 200.

In addition, the present invention is also applicable to an electric vehicle that does not include engine 100 and travels by using only electric power, and a fuel cell vehicle that further includes a fuel cell as a power supply in addition to a power storage device.

In the foregoing, limit switch 312, resistance element 508 and auxiliary power supply node 506 form an example of "signal generating circuit" in the present invention. In addition, power supply CPU 530 corresponds to an example of "activation controller" in the present invention, and switching circuit 510 and resistance circuit 520 form an example of "signal manipulating circuit" in the present invention. Furthermore, control CPU 532 corresponds to an example of "abnormality detecting unit" in the present invention.

It should be understood that the embodiments disclosed herein are illustrative and not limitative in any respect. The scope of the present invention is defined by the terms of the claims, rather than the above description of the embodiments, and is intended to include any modifications within the scope and meaning equivalent to the terms of the claims.

The invention claimed is:

1. An apparatus for activating a system of a vehicle configured to be capable of charging a vehicle-mounted power storage device for driving the vehicle from a power supply external to the vehicle, comprising:

a signal generating circuit configured to be capable of generating a connection signal indicating connection between said vehicle and a charging cable through which electric power is supplied from said power supply to said vehicle;

an EVSE controller provided outside said vehicle and configured to be capable of generating a pilot signal whose pulse width is modulated based on a magnitude of a rated current that can be supplied to said vehicle through said charging cable and sending said pilot signal to said vehicle;

an activation controller mounted on said vehicle for activating the system of said vehicle in accordance with a system activation operation by a user when travel of the vehicle is requested, and for activating said system in accordance with any one of said connection signal and said pilot signal when charging of said power storage device from said power supply is requested; and a signal manipulating circuit mounted on said vehicle and configured to be capable of notifying said EVSE controller to provide said pilot signal in a non-pulsed manner until said system is activated by said activation controller, by manipulating a potential of said pilot signal.

2. The apparatus for activating a system of a vehicle according to claim 1, wherein a pulse cycle of said pilot signal is shorter than an operation cycle of said activation controller.

3. The apparatus for activating a system of a vehicle according to claim 1, wherein
by manipulating the potential of said pilot signal in accordance with the connection between said charging cable and said vehicle as well as a state of said vehicle, said signal manipulating circuit notifies said EVSE controller of said connection and said state of the vehicle, and in addition, notifies said EVSE controller to provide said pilot signal in the non-pulsed manner until said system is activated by said activation controller.

4. The apparatus for activating a system of a vehicle according to claim 3, wherein
said signal manipulating circuit includes
a resistance circuit configured to be capable of changing the potential of said pilot signal in stages in accordance with the connection between said charging cable and said vehicle as well as said state of the vehicle, and
a switching circuit placed between an input terminal of said pilot signal in said vehicle and said resistance circuit as well as said activation controller, for outputting, to said activation controller, said pilot signal input from said input terminal without passing through said resistance circuit until said system is activated by said activation controller, and switching, to said resistance circuit, an output destination of said pilot signal input from said input terminal, when said system is activated by said activation controller.

5. The apparatus for activating a system of a vehicle according to claim 4, wherein
said switching circuit switches, to said activation controller, the output destination of said pilot signal input from said input terminal, when charging of said power storage device from said power supply stops.

6. The apparatus for activating a system of a vehicle according to claim 4, further comprising:
an abnormality detecting unit for detecting that said pilot signal is abnormal, when a state in which said pilot signal does not oscillate and the potential of said pilot signal is generated continues for a prescribed time period after the output destination of said pilot signal is switched to said resistance circuit by said switching circuit.

7. The apparatus for activating a system of a vehicle according to claim 1, wherein
a charger for converting electric power supplied from said power supply to a voltage level of said power storage device and charging said power storage device is mounted on said vehicle.

8. A method for activating a system of a vehicle configured to be capable of charging a vehicle-mounted power storage device for driving the vehicle from a power supply external to the vehicle, comprising the steps of:

activating the system of said vehicle in accordance with a system activation operation by a user when travel of the vehicle is requested;
activating said system in accordance with any one of a connection signal indicating connection between said vehicle and a charging cable through which electric power is supplied from said power supply to said vehicle, and a pilot signal which is generated by an EVSE controller provided outside the vehicle and whose pulse width is modulated based on a magnitude of a rated current that can be supplied to said vehicle through said charging cable, when charging of said power storage device from said power supply is requested; and
notifying said EVSE controller to provide said pilot signal in a non-pulsed manner until said system is activated, by manipulating a potential of said pilot signal in said vehicle.

9. The method for activating a system of a vehicle according to claim 8, wherein
in the step of activating said system in accordance with any one of said connection signal and said pilot signal, said connection signal and said pilot signal are sampled at a prescribed cycle, and
a pulse cycle of said pilot signal is shorter than said prescribed cycle.

10. The method for activating a system of a vehicle according to claim 8, further comprising the steps of:
notifying said EVSE controller of permission for oscillation of said pilot signal by manipulating the potential of said pilot signal, when said system is activated; and
detecting that said pilot signal is abnormal, when a state in which said pilot signal does not oscillate and the potential of said pilot signal is generated continues for a prescribed time period after said system is activated.

11. The apparatus for activating a system of a vehicle according to claim 5, further comprising:
an abnormality detecting unit for detecting that said pilot signal is abnormal, when a state in which said pilot signal does not oscillate and the potential of said pilot signal is generated continues for a prescribed time period after the output destination of said pilot signal is switched to said resistance circuit by said switching circuit.

12. The method for activating a system of a vehicle according to claim 9, further comprising the steps of:
notifying said EVSE controller of permission for oscillation of said pilot signal by manipulating the potential of said pilot signal, when said system is activated; and
detecting that said pilot signal is abnormal, when a state in which said pilot signal does not oscillate and the potential of said pilot signal is generated continues for a prescribed time period after said system is activated.

* * * * *